United States Patent
Li et al.

(10) Patent No.: US 9,806,330 B2
(45) Date of Patent: Oct. 31, 2017

(54) LITHIUM-RICH ELECTRODE PLATE OF LITHIUM-ION BATTERY AND PREPARATION METHOD THEREOF

(71) Applicant: Ningde Amperex Technology Limited, Ningde (CN)

(72) Inventors: Baiqing Li, Ningde (CN); Shengwu Zhang, Ningde (CN); Xinghua Tao, Ningde (CN); Baiqing Zhang, Ningde (CN)

(73) Assignee: NINGDE AMPEREX TECHNOLOGY LIMITED, Ningde, Fujian Province (CN)

( * ) Notice: Subject to any disclaimer, the term of this patent is extended or adjusted under 35 U.S.C. 154(b) by 197 days.

(21) Appl. No.: 14/728,636

(22) Filed: Jun. 2, 2015

(65) Prior Publication Data
US 2015/0357628 A1    Dec. 10, 2015

(30) Foreign Application Priority Data

Jun. 5, 2014 (CN) .......................... 2014 1 0246563

(51) Int. Cl.
| | |
|---|---|
| *H01M 4/00* | (2006.01) |
| *H01M 4/134* | (2010.01) |
| *H01M 4/38* | (2006.01) |
| *H01M 4/04* | (2006.01) |
| *H01M 4/1395* | (2010.01) |
| *H01M 4/36* | (2006.01) |
| *H01M 4/62* | (2006.01) |
| *H01M 10/052* | (2010.01) |

(52) U.S. Cl.
CPC ......... *H01M 4/134* (2013.01); *H01M 4/0483* (2013.01); *H01M 4/1395* (2013.01); *H01M 4/366* (2013.01); *H01M 4/382* (2013.01); *H01M 4/62* (2013.01); *H01M 4/0404* (2013.01); *H01M 10/052* (2013.01)

(58) Field of Classification Search
CPC ... H01M 4/0483; H01M 4/382; H01M 10/052
See application file for complete search history.

(56) References Cited

U.S. PATENT DOCUMENTS

| | | | | |
|---|---|---|---|---|
| 3,957,532 A | * | 5/1976 | Settle | .................... C22C 1/0416 419/10 |
| 2002/0037457 A1 | * | 3/2002 | Choi | ....................... C22C 24/00 429/231.95 |

FOREIGN PATENT DOCUMENTS

| | | |
|---|---|---|
| CN | 1290209 C | 12/2006 |
| CN | 102779975 A | 11/2012 |
| JP | 2005038720 A | 2/2005 |
| WO | WO9627910 A1 | 9/1996 |

* cited by examiner

*Primary Examiner* — Robert Vetere
(74) *Attorney, Agent, or Firm* — Morgan, Lewis & Bockius LLP

(57) ABSTRACT

The present disclosure provides a lithium-rich electrode plate of a lithium-ion battery and a preparation method thereof. The preparation method of the lithium-rich electrode plate of the lithium-ion battery comprises steps of: (1) in a protective gas environment, melting a lithium ingot to obtain a melting lithium; (2) in a vacuum environment, heating and drying ceramic particles to obtain dried and anhydrous ceramic particles; (3) in a protective gas environment, adding the dried and anhydrous ceramic particles into the melting lithium, stirring to make them uniformly mixed to obtain a modified melting lithium; (4) in a protective gas environment, uniformly coating the modified melting lithium on a surface of an electrode plate to be lithium rich to form a lithium-rich layer, which is followed by cooling to room temperature to obtain a lithium-rich electrode plate of a lithium-ion battery. The lithium-rich electrode plate is prepared according to the preparation method.

14 Claims, No Drawings

LITHIUM-RICH ELECTRODE PLATE OF LITHIUM-ION BATTERY AND PREPARATION METHOD THEREOF

CROSS-REFERENCE TO RELATED APPLICATIONS

The present application claims priority to Chinese patent application No. CN201410246563.9, filed on Jun. 5, 2014, which is incorporated herein by reference in its entirety.

FIELD OF THE PRESENT DISCLOSURE

The present disclosure relates to a field of a battery technology, and more specifically to a lithium-rich electrode plate of a lithium-ion battery and a preparation method thereof.

BACKGROUND OF THE PRESENT DISCLOSURE

Since the lithium-ion battery has been widely commercialized, due to advantages, such as a high energy density and a high power density, the lithium-ion battery is widely applied in portable electronic devices, such as laptops, cameras and mobile phones. However, as the design constantly updates and the integrated features increases, people present a higher requirement on the energy density of the lithium-ion battery.

In order to improve the energy density of the lithium-ion battery, one method is to use a negative active material with a high specific capacity per gram (such as silicon-carbon composite negative active material and alloy negative active material). However, these negative active materials with a high specific capacity per gram have low first coulombic efficiency, and cannot significantly improve the energy density of the lithium-ion battery. In order to overcome this deficiency, it is necessary to perform a lithium-rich treatment on the electrode plate of the lithium-ion battery.

Chinese patent document with an issuance publication No. CN1290209C issued on Dec. 13, 2006 discloses a method of mixing a lithium metal, a negative active material and a non-aqueous liquid to form a slurry, then coating the slurry on a currect collector and performing a drying process and obtaining a negative electrode plate. Although this method can obtain a lithium-rich negative electrode plate, however, after the lithium metal is intercalated (absorbed) by the negative active material, voids will be left at the position of the original lithium metal on the negative electrode plate, thereby increasing the contact resistance between particles of the negative electrode plate.

Chinese patent document published as No. CN102779975A on Nov. 14, 2012 discloses a method of filtrating lithium powder with a filter screen via vibration and electric field to spill the lithium powder on a surface of a negative electrode plate to form a lithium-rich layer. The above method is simple in process, the slurry is not needed to prepare, however, the production efficiency is relatively low, and the problem that the spilled lithium powders are not uniform easily arises in actual operation. Moreover, the lithium powder easily floats in the air, thereby resulting in a serious safety hazard. Also, the lithium powder is expensive in price, and the production cost is relatively high.

An international patent application published as No. WO96/27910A1 on Sep. 12, 1996 discloses a method of coating a layer of lithium sheet on a negative electrode plate to obtain a lithium-rich negative electrode plate. The thickness of the lithium sheet in the above method makes the lithium amount thereof much more than the needed lithium amount of the negative electrode plate, the extra lithium will result in a serious safety hazard on the lithium-ion battery, and the extra lithium will also result in a disadvantage on the thickness of the lithium-ion battery.

Japanese patent document published as No. JP2005038720A on Feb. 10, 2005 discloses a method of depositing a lithium metal layer on a surface of a negative electrode plate via a method of vacuum deposition. The operating of the above method needs to be performed under a high vacuum environment, the production efficiency is relatively low and the production cost is relatively high.

SUMMARY OF THE PRESENT DISCLOSURE

In view of the problems existing in the background technology, an object of the present disclosure is to provide a lithium-rich electrode plate of a lithium-ion battery and a preparation method thereof, which has advantages of low cost, high efficiency, high quality, safety and friendly environment.

In order to achieve the above object, in a first aspect of the present disclosure, the present disclosure provides a preparation method of a lithium-rich electrode plate of a lithium-ion battery, which comprises steps of: (1) in a protective gas environment, melting a lithium ingot to obtain a melting lithium; (2) in a vacuum environment, heating and drying ceramic particles to obtain dried and anhydrous ceramic particles; (3) in a protective gas environment, adding the dried and anhydrous ceramic particles into the melting lithium, stirring to make them uniformly mixed to obtain a modified melting lithium; (4) in a protective gas environment, uniformly coating the modified melting lithium on a surface of an electrode plate to be lithium-rich to form a lithium-rich layer, which is followed by cooling to room temperature to obtain a lithium-rich electrode plate of a lithium-ion battery.

In a second aspect of the present disclosure, the present disclosure provides a lithium-rich electrode plate of a lithium-ion battery, which is prepared according to the preparation method of the lithium-rich electrode plate of the lithium-ion battery of the first aspect of the present disclosure.

The present disclosure has following beneficial effects:

1. In the preparation method of the lithium-rich electrode plate of the lithium-ion battery according to the present disclosure, a process that the lithium ingot is fabricated into the lithium powder is not needed, thereby substantially decreasing the production cost.

2. In the preparation method of the lithium-rich electrode plate of the lithium-ion battery according to the present disclosure, the lithium is supplemented on the surface of the electrode plate to be lithium rich, thereby preventing voids from forming in the interior of the electrode plate to be lithium rich.

3. In the preparation method of the lithium-rich electrode plate of the lithium-ion battery according to the present disclosure, the modified melting lithium is directly coated on the surface of the electrode plate to be lithium rich to form the lithium-rich layer, thereby avoiding the safety hazard due to floating of the lithium powder in the air in the conventional lithium powder spilling process.

4. In the preparation method of the lithium-rich electrode plate of the lithium-ion battery according to the present disclosure, the modified melting lithium is coated on the surface of the electrode plate to be lithium rich via extrusion coating or gravure printing, the two coating methods are mature coating technologies in large-scale industrial production, and have a huge advantage on production efficiency, coat weight control and dimensional accuracy control.

5. In the preparation method of the lithium-rich electrode plate of the lithium-ion battery according to the present disclosure, not only pelletizing phenomenon is prevented when the modified melting lithium is coated on the surface of the electrode plate to be lithium rich, but also the lithium is uniformly supplemented on the electrode plate to be lithium rich, and the ceramic particles of the modified melting lithium also improve the safety performance of the lithium-ion battery.

DETAILED DESCRIPTION

Hereinafter a lithium-rich electrode plate of a lithium-ion battery and a preparation method thereof and examples, comparative examples and test results according to the present disclosure will be described in detail.

Firstly, a preparation method of a lithium-rich electrode plate of a lithium-ion battery according to a first aspect of the present disclosure will be described.

A preparation method of a lithium-rich electrode plate of a lithium-ion battery according to a first aspect of the present disclosure comprises steps of: (1) in a protective gas environment, melting a lithium ingot to obtain a melting lithium; (2) in a vacuum environment, heating and drying ceramic particles to obtain dried and anhydrous ceramic particles; (3) in a protective gas environment, adding the dried and anhydrous ceramic particles into the melting lithium, stirring to make them uniformly mixed to obtain a modified melting lithium; (4) in a protective gas environment, uniformly coating the modified melting lithium on a surface of an electrode plate to be lithium-rich to form a lithium-rich layer, which is followed by cooling to room temperature to obtain a lithium-rich electrode plate of a lithium-ion battery.

In the lithium-rich process, since the surface tension of the melting lithium is relatively large (about 397 dyn/cm), if the melting lithium is directly coated on the surface of the electrode plate to be lithium rich, pelletizing phenomenon will occur, and as the coating thickness is smaller, the pelletizing phenomenon is more serious. At present the required thickness of lithium of the electrode plate to be lithium rich ranges from several microns to several tens of microns, a serious pelletizing phenomenon will occur in this range of required thickness of lithium when the melting lithium is directly coated, and there is no possibility that the lithium-rich layer will be formed on the surface of the electrode plate to be lithium rich in form of a membrane. However, adding the dried and anhydrous ceramic particles into the melting lithium may modify the melting lithium, in which the ceramic particle will play a role of pinning point in the melting lithium, thereby suppressing the trend of the pelletizing phenomenon of the melting lithium, and obtaining the modified melting lithium, and further allowing the modified melting lithium to be uniformly coated on the surface of the electrode plate to be lithium rich. Moreover, the ceramic particle of the lithium-rich layer may cover the surface of the electrode plate to be lithium rich to become a relatively dense ceramic protective layer, thereby increasing the short circuit resistance, and improving the safety performance of the lithium-ion battery.

The preparation method of the lithium-rich electrode plate of the lithium-ion battery according to the first aspect of the present disclosure, in the step (1), a protective gas in the protective gas environment may be inactive gas, preferably may be argon or helium.

The preparation method of the lithium-rich electrode plate of the lithium-ion battery according to the first aspect of the present disclosure, in the step (1), a purity of the lithium ingot may be ≥97%, preferably may be ≥99%.

In the preparation method of the lithium-rich electrode plate of the lithium-ion battery according to the first aspect of the present disclosure, in the step (1), a melting temperature of melting the lithium ingot may be more than 180° C. and less than or equal to 400° C., preferably may be 185° C.~250° C. The melting temperature of melting the lithium ingot cannot be too high, or else the melting lithium will have a relative high reactivity; the melting temperature of melting the lithium ingot cannot be less than melting point of the lithium (180° C.), or else the melting lithium will be solidified.

In the preparation method of the lithium-rich electrode plate of the lithium-ion battery according to the first aspect of the present disclosure, in the step (2), a vacuum degree of the vacuum environment may be less than −90 KPa.

In the preparation method of the lithium-rich electrode plate of the lithium-ion battery according to the first aspect of the present disclosure, in the step (2), a material of the ceramic particle may be at least one selected from a group consisted of $Al_2O_3$, $TiO_2$, $SiO_2$, $MgO$, $BeO$, $Y_2O_3$, $ZrO_2$, $Al(OH)_3$, $Mg(OH)_2$, $Ti(OH)_4$, $Si_3N_4$, $BN$ and $AlPO_4$.

In the preparation method of the lithium-rich electrode plate of the lithium-ion battery according to the first aspect of the present disclosure, in the step (2), a particle diameter D50 of the ceramic particle may be 0.05 μm~3 μm, preferably may be 0.2 μm~1 μm. If the particle diameter D50 of the ceramic particle is too large, the roughness of the surface of the electrode plate to be lithium rich becomes relatively large after the modified melting lithium is uniformly coated on the surface of the electrode plate to be lithium rich, thereby affecting the K value of the lithium-ion battery; if the particle diameter D50 of the ceramic particle is too small, the surface activity of the ceramic particle will be increased, the risk that the ceramic particle reacts with the melting lithium will also increase.

In the preparation method of the lithium-rich electrode plate of the lithium-ion battery according to the first aspect of the present disclosure, in the step (2), a drying temperature in the vacuum environment may be 150° C.~600° C., a drying time in the vacuum environment may be 2 h~24 h.

In the preparation method of the lithium-rich electrode plate of the lithium-ion battery according to the first aspect of the present disclosure, in the step (2), a water content of the dried and anhydrous ceramic particle may be less than or equal to 5 ppm. If the water content of the dried and anhydrousceramic particle is too high, the water and the melting lithium easily react with each other.

In the preparation method of the lithium-rich electrode plate of the lithium-ion battery according to the first aspect of the present disclosure, in the step (3), a protective gas in the protective gas environment may be inactive gas, preferably may be argon or helium.

In the preparation method of the lithium-rich electrode plate of the lithium-ion battery according to the first aspect of the present disclosure, in the step (3), a mass of the dried and anhydrous ceramic particle may be 5%~80% of a mass of the melting lithium, preferably may be 10%~30%. If the weight percentage of the dried and anhydrous ceramic particle added into the melting lithium is relatively small, the modifying effect on the melting lithium is not obvious; if the weight percentage of the dried and anhydrous ceramic particle added into the melting lithium is relatively large, the flowability of the modified melting lithium will be affected, thereby affecting the coating effect of the modified melting lithium on the surface of the electrode plate to be lithium rich.

In the preparation method of the lithium-rich electrode plate of the lithium-ion battery according to the first aspect of the present disclosure, in the step (4), a protective gas in the protective gas environment may be inactive gas, preferably may be argon or helium.

In the preparation method of the lithium-rich electrode plate of the lithium-ion battery according to the first aspect of the present disclosure, in the step (4), a coating thickness of the modified melting lithium may be 1 μm~50 μm, preferably may be 3 μm~30 μm.

In the preparation method of the lithium-rich electrode plate of the lithium-ion battery according to the first aspect of the present disclosure, in the step (4), that the modified melting lithium is coated on the surface of the electrode plate to be lithium rich may be performed by extrusion coating or gravure printing. The two coating methods are mature coating technologies in large-scale industrial production, and have a huge advantage on production efficiency, coat weight control and dimensional accuracy control.

In the preparation method of the lithium-rich electrode plate of the lithium-ion battery according to the first aspect of the present disclosure, in the step (4), the electrode plate to be lithium-rich may be a pressed negative electrode plate of the lithium-ion battery or a pressed positive electrode plate of the lithium-ion battery. Specifically, the electrode plate to be lithium rich may be selected from a cold pressed negative electrode plate of the lithium-ion battery, a hot pressed negative electrode plate of the lithium-ion battery, a cold pressed positive electrode plate of the lithium-ion battery or a hot pressed positive electrode plate of the lithium-ion battery. When the electrode plate to be lithium rich is a pressed negative electrode plate of the lithium-ion battery, the negative active material may be silicon-based material, the silicon-based material may be one selected from a group consisted of Si, Si alloy, Si/C, $SiO_x$ and $SiO_x/C$, where $0.5 \leq x \leq 1.5$. When the electrode plate to be lithium rich is a pressed positive electrode plate of the lithium-ion battery, the positive active material may be lithium cobaltate.

Secondly, a lithium-rich electrode plate of a lithium-ion battery according to a second aspect of the present disclosure will be described.

A lithium-rich electrode plate of a lithium-ion battery according to a second aspect of the present disclosure is prepared according to the preparation method of the lithium-rich electrode plate of the lithium-ion battery according to the first aspect of the present disclosure.

Then examples and comparative examples of the lithium-rich electrode plate of the lithium-ion battery and the preparation method thereof according to the present disclosure would be described.

Example 1

A. Preparation of a Negative Electrode Plate to be Lithium Rich of a Lithium-Ion Battery Negative active material (SiO/C, a weight percentage of SiO in SiO/C was 10%), conductive agent (conductive carbon black) and adhesive (SBR/CMC) according to a mass ratio of 94:2:4 were uniformly mixed with solvent (denionined water) to form a negative electrode slurry, then the negative electrode slurry was uniformly coated on both surfaces of negative current collector (copper foil) and dried, which was followed by cold pressing, and finally a negative electrode plate to be lithium rich of a lithium-ion battery was obtained.

B. Preparation of a Lithium-Rich Negative Electrode Plate of a Lithium-Ion Battery (1) In an argon protective gas environment, a lithium ingot with a purity of 99.9% was heated and melt to obtain a melting lithium under 250° C.; (2) in a vacuum environment under 160° C. and a vacuum degree$\leq$-97 KPa, MgO ceramic particles with a particle diameter D50 of 0.5 μm were heated and dried for 24 h to obtain dried and anhydrous MgO ceramic particles, and a water content of the dried and anhydrous MgO ceramic particles was ensured to less than or equal to 5 ppm; (3) in an argon protective gas environment, the dried and anhydrous MgO ceramic particles were added into the melting lithium and were uniformly mixed by stirring to obtain a modified melting lithium, a mass ratio of the dried and anhydrous MgO ceramic particles to the melting lithium was 2:8; (4) in an argon protective gas environment, the modified melting lithium was transported to an extrusion coating machine via a pipeline transportation system, then the modified melting lithium was uniformaly coated on both surfaces of the negative electrode plate to be lithium rich to respectively form lithium-rich layers, in which a coating thickness of the modified melting lithium on a single surface was 10 μm, which was followed by cooling to room temperature, cutting, welding a negative tab, a lithium-rich negative electrode plate of a lithium-ion battery was obtained.

C. Preparation of a Positive Electrode Plate of a Lithium-Ion Battery

Positive active material (lithium cobaltate), conductive agent (acetylene black) and adhesive (polyvinylidene fluoride (PVDF)) according to a mass ratio of 97:1:2 were uniformly mixed with solvent (N-methyl pyrrolidone (NMP)) to form a positive electrode slurry, then the positive electrode slurry was uniformly coated on both surfaces of positive current collector (aluminum foil) and dried, which was followed by cold pressing, cutting, welding a positive tab, and finally a positive electrode plate of the lithium-ion battery was obtained.

D. Preparation of a Lithium-Ion Battery

The prepared positive electrode plate, the lithium-rich negative electrode plate and a separator (a porous PE membrane) were wound together to form a cell, which was followed by packaging, injecting an electrolyte (a solution containing $LiPF_6$ with a concentration of 1 mol/L and a non-aqueous organic solvent which was a mixture of EC and DEC according to a mass ratio of 3:7), a small current was applied to help to improve the dissolution of the modified melting lithium in the lithium-rich layer, after the modified melting lithium was dissolved, reshaping of the cell was performed under 1.0 MPa to impel the MgO ceramic particles in the lithium-rich layer to become a dense ceramic protective layer, which was followed by formation, finally a lithium-ion battery was obtained.

Example 2

A. Preparation of a Negative Electrode Plate to be Lithium Rich of a Lithium-Ion Battery It was the same as that in example 1 except that the weight percentage of SiO in the negative active material SiO/C was 30%.

B. Preparation of a Lithium-Rich Negative Electrode Plate of a Lithium-Ion Battery (1) In an argon protective gas environment, a lithium ingot with a purity of 99.9% was heated and melt to obtain a melting lithium under 250° C.; (2) in a vacuum environment under 160° C. and a vacuum degree≤-97 KPa, $TiO_2$ ceramic particles with a particle diameter D50 of 0.5 μm were heated and dried for 24 h to obtain dried and anhydrous $TiO_2$ ceramic particles, and a water content of the dried and anhydrous $TiO_2$ ceramic particles was ensured to less than or equal to 5 ppm; (3) in an argon protective gas environment, the dried and anhydrous $TiO_2$ ceramic particles were added into the melting lithium and were uniformly mixed by stirring to obtain a modified melting lithium, a mass ratio of the dried and anhydrous $TiO_2$ ceramic particles to melting lithium was 2:8; (4) in an argon protective gas environment, the modified melting lithium was transported to an extrusion coating machine via a pipeline transportation system, then the modified melting lithium was uniformaly coated onto both surfaces of the negative electrode plate to be lithium rich to respectively form lithium-rich layers, in which a coating thickness of the modified melting lithium on a single surface was 20 μm, which was followed by cooling to room temperature, cutting, welding a negative tab, a lithium-rich negative electrode plate of a lithium-ion battery was obtained.

C. Preparation of a Positive Electrode Plate of a Lithium-Ion Battery

It was the same as that in example 1.

D. Preparation of a Lithium-Ion Battery

The prepared positive electrode plate, the lithium-rich negative electrode plate and a separator (a porous PE membrane) were wound together to form a cell, which was followed by packaging, injecting an electrolyte (a solution containing $LiPF_6$ with a concentration of 1 mol/L and a non-aqueous organic solvent which was a mixture of EC and DEC according to a mass ratio of 3:7), a small current was applied to help to improve the dissolution of the modified melting lithium in the lithium-rich layer, after the modified melting lithium was dissolved, reshaping of the cell was performed under 1.0 MPa to impel the $TiO_2$ ceramic particles in the lithium-rich layer to become a dense ceramic protective layer, which was followed by formation, finally a lithium-ion battery was obtained.

Example 3

A. Preparation of a Positive Electrode Plate to be Lithium Rich of a Lithium-Ion Battery Positive active material (lithium cobaltate), conductive agent (acetylene black) and adhesive (polyvinylidene fluoride (PVDF)) according to a mass ratio of 97:1:2 were uniformly mixed with solvent (N-methyl pyrrolidone (NMP)) to form a positive electrode slurry, then the positive electrode slurry was uniformly coated on both surfaces of positive current collector (aluminum foil) and dried, which was followed by cold pressing, and finally a positive electrode plate to be lithium rich of a lithium-ion battery was obtained.

B. Preparation of a Lithium-Rich Positive Electrode Plate of a Lithium-Ion Battery (1) in an argon protective gas environment, a lithium ingot with a purity of 99.9% was heated and melt to obtain a melting lithium under 250° C.; (2) in a vacuum environment under 600° C. and a vacuum degree≤-97 KPa, $AlPO_4$ ceramic particles with a particle diameter D50 of 3 μm were heated and dried for 24 h to obtain dried and anhydrous $AlPO_4$ ceramic particles, and a water content of the dried and anhydrous $TiO_2$ ceramic particles was ensured to less than or equal to 5 ppm; (3) in an argon protective gas environment, the dried and anhydrous $AlPO_4$ ceramic particles were added into the melting lithium and were uniformly mixed by stirring to obtain a modified melting lithium, a mass ratio of the dried and anhydrous $AlPO_4$ ceramic particles to the melting lithium was 2:8; (4) in an argon protective gas environment, the modified melting lithium was transported to an extrusion coating machine via a pipeline transportation system, then the modified melting lithium was uniformaly coated onto both surfaces of the positive electrode plate to be lithium rich to respectively form lithium-rich layers, in which a coating thickness of the modified melting lithium on a single surface was 30 μm, which was followed by cooling to room temperature, cutting, welding a positive tab, a lithium-rich positive electrode plate of a lithium-ion battery was obtained.

C. Preparation of a Negative Electrode Plate of a Lithium-Ion Battery

Negative active material (SiO/C, a weight percentage of SiO in SiO/C was 50%), conductive agent (conductive carbon black) and adhesive (SBR/CMC) according to a mass ratio of 94:2:4 were uniformly mixed with solvent (denioned water) to form a negative electrode slurry, then the negative electrode slurry was uniformly coated on both surfaces of negative current collector (copper foil) and dried, which was followed by cold pressing, cutting, welding a negative tab, and finally a negative electrode plate of a lithium-ion battery was obtained.

D. Preparation of a Lithium-Ion Battery

The prepared lithium-rich positive electrode plate, the negative electrode plate and a separator (a porous PE membrane) were wound together to form a cell, which was followed by packaging, injecting an electrolyte (a solution containing $LiPF_6$ with a concentration of 1 mol/L and a non-aqueous organic solvent which was a mixture of EC and DEC according to a mass ratio of 3:7), a small current was applied to help to improve the dissolution of the modified melting lithium in the lithium-rich layer, after the modified melting lithium was dissolved, reshaping of the cell was performed under 1.0 MPa to impel the $AlPO_4$ ceramic particles in the lithium-rich layer to become a dense ceramic protective layer, which was followed by formation, finally a lithium-ion battery was obtained.

Comparative Example 1

The lithium-ion battery was prepared the same as that in example 1 except that in the preparation of a lithium-rich negative electrode plate of a lithium-ion battery (that was step B), step (2) and step (3) in the step B were not conducted (in other words, MgO ceramic particles were not added and the corresponding processing steps of MgO ceramic particles were not performed).

Comparative Example 2

The lithium-ion battery was prepared the same as that in example 1 except that in the preparation of a lithium-rich negative electrode plate of a lithium-ion battery (that was step B), the mass ratio of the dried and anhydrous MgO ceramic particles to the melting lithium was 5:5.

Comparative Example 3

The lithium-ion battery was prepared the same as that in example 1 except that in the preparation of a lithium-rich negative electrode plate of a lithium-ion battery (that was step B), the particle diameter D50 of the MgO ceramic particles was 5 μm.

Finally testing processes and test results of lithium-rich electrode plates of lithium-ion batteries and the preparation method thereof according to examples 1-3 and comparative examples 1-3 would be described.

(1) Testing of the Capacity of the Lithium-Ion Battery

At 25° C., the lithium-ion battery was charged to 4.2V at a constant current of 0.1 C (160 mA), then the lithium-ion battery was charged to less than 0.05 C (80 mA) at a constant voltage of 4.2V to obtain a first charging capacity; then the lithium-ion battery was discharged to 3.0V at a constant current of 0.5 C (800 mA) to obtain a first discharging capacity.

(2) Testing of the First Coulombic Efficiency of the Lithium-Ion Battery

The first coulombic efficiency of the lithium-ion battery (%)=(the first discharging capacity/the first charging capacity)×100%.

(3) Testing of the Nail Penetrating Test of the Lithium-Ion Battery

A nail with a diameter of 2 mm-3 mm was selected to penetrate into the center of the lithium-ion battery at a moving speed of 100 mm/s, the lithium-ion battery would be identified as qualified if no burning or no explosion occurred, and a pass rate of the lithium-ion battery was calculated.

Table 1 illustrated the test results of the lithium-ion batteries of examples 1-3 and comparative examples 1-3.

TABLE 1

Test results of the lithium-ion batteries of examples 1-3 and comparative examples 1-3

|  | first charging capacity (mAh) | first coulombic efficiency (%) | nail penetrating test |
| --- | --- | --- | --- |
| Example 1 | 1820 | 92 | 20/20 |
| Example 2 | 1860 | 92 | 20/20 |
| Example 3 | 1900 | 92 | 20/20 |
| Comparative example 1 | 1745 | 87 | 13/20 |
| Comparative example 2 | 1753 | 88 | 14/20 |
| Comparative example 3 | 1820 | 92 | 16/20 |

It could be seen from a comparison between examples 1-3 and comparative examples 1-3 of Table 1, the first charging capacity, the first coulombic efficiency and the pass rate of the nail penetrating test of the lithium-ion battery using the lithium-rich electrode plate were significantly improved. This was because the ceramic particles would function as pinning points in the melting lithium, thereby preventing the trend of the pelletizing phenomenon of the melting lithium and obtaining the modified melting lithium, further the modified melting lithium was uniformly coated on the surface of the electrode plate to be lithium rich. Moreover, the ceramic particle of the lithium-rich layer may cover the surface of the electrode plate to be lithium rich to become a dense ceramic protective layer, therefore increasing the short circuit resistance, and further improving the safety performance of the lithium-ion battery.

It could be seen from a comparison between example 1 and comparative example 2, if the weight percentage of the dried and anhydrous ceramic particles added into the melting lithium was too large, the first charging capacity, the first coulombic efficiency and the pass rate of the nail penetrating test of the lithium-ion battery all became worse, this was because too many ceramic particles would affect the flowability of the modified melting lithium, thereby affecting the coating performance of the modified melting lithium on the surface of the electrode plate to be lithium rich, and further affecting the performance of the lithium-ion battery.

It could be seen from a comparison between example 1 and comparative example 3, although the first charging capacity and the first coulombic efficiency of the lithium-ion battery of comparative example 3 and the lithium-ion battery of example 1 were almost equal, the pass rate of the nail penetrating test of the lithium-ion battery of comparative example 3 was significantly decreased, this was because the particle diameter D50 of the ceramic particle of comparative example 3 was relatively large, which would make the roughness of the surface of the electrode plate to be lithium rich also become relatively large after the modified melting lithium was uniformly coated on the surface of the electrode plate to be lithium rich, thereby affecting the K value of the lithium-ion battery, and in turn weakening the modifying effect on the safety performance of the lithium-ion battery.

What is claimed is:

1. A preparation method of a lithium-rich electrode plate of a lithium-ion battery, comprising steps of:
   (1) in a protective gas environment, melting a lithium ingot to obtain a melting lithium;
   (2) in a vacuum environment, heating and drying ceramic particles to obtain dried and anhydrous ceramic particles;
   (3) in a protective gas environment, adding the dried and anhydrous ceramic particles into the melting lithium, stirring to make them uniformly mixed to obtain a modified melting lithium;

(4) in a protective gas environment, uniformly coating the modified melting lithium on a surface of an electrode plate to be lithium-rich to form a lithium-rich layer, which is followed by cooling to room temperature to obtain a lithium-rich electrode plate of a lithium-ion battery.

2. The preparation method of the lithium-rich electrode plate of the lithium-ion battery according to claim 1, wherein in the step (1), a purity of the lithium ingot is ≥97%.

3. The preparation method of the lithium-rich electrode plate of the lithium-ion battery according to claim 2, wherein in the step (1), the purity of the lithium ingot is ≥99%.

4. The preparation method of the lithium-rich electrode plate of the lithium-ion battery according to claim 1, wherein in the step (1), a melting temperature of melting the lithium ingot is more than 180° C. and less than or equal to 400° C.

5. The preparation method of the lithium-rich electrode plate of the lithium-ion battery according to claim 4, wherein in the step (1), the melting temperature of melting the lithium ingot is 185° C.~250° C.

6. The preparation method of the lithium-rich electrode plate of the lithium-ion battery according to claim 1, wherein in the step (2), a material of the ceramic particle is at least one selected from a group consisted of $Al_2O_3$, $TiO_2$, $SiO_2$, MgO, BeO, $Y_2O_3$, $ZrO_2$, $Al(OH)_3$, $Mg(OH)_2$, $Ti(OH)_4$, $Si_3N_4$, BN and $AlPO_4$.

7. The preparation method of the lithium-rich electrode plate of the lithium-ion battery according to claim 1, wherein in the step (2), a particle diameter D50 of the ceramic particle is 0.05 μm~3 μm.

8. The preparation method of the lithium-rich electrode plate of the lithium-ion battery according to claim 7, wherein in the step (2), the particle diameter D50 of the ceramic particle is 0.2 μm~1 μm.

9. The preparation method of the lithium-rich electrode plate of the lithium-ion battery according to claim 1, wherein in the step (2), a water content of the dried and anhydrous ceramic particle is less than or equal to 5 ppm.

10. The preparation method of the lithium-rich electrode plate of the lithium-ion battery according to claim 1, wherein in the step (3), a mass of the dried and anhydrous ceramic particle is 5%~80% of a mass of the melting lithium.

11. The preparation method of the lithium-rich electrode plate of the lithium-ion battery according to claim 10, wherein in the step (3), the mass of the dried and anhydrous ceramic particle is 10%~30% of the mass of the melting lithium.

12. The preparation method of the lithium-rich electrode plate of the lithium-ion battery according to claim 1, wherein in the step (4), a coating thickness of the modified melting lithium is 1 μm~50 μm.

13. The preparation method of the lithium-rich electrode plate of the lithium-ion battery according to claim 12, wherein in the step (4), the coating thickness of the modified melting lithium is 3 μm~30 μm.

14. The preparation method of the lithium-rich electrode plate of the lithium-ion battery according to claim 1, wherein in the step (4), the electrode plate to be lithium-rich is a pressed negative electrode plate of the lithium-ion battery or a pressed positive electrode plate of the lithium-ion battery.

* * * * *